US 7,720,739 B2

(12) United States Patent
Tanemura

(10) Patent No.: US 7,720,739 B2
(45) Date of Patent: May 18, 2010

(54) METHOD OF AND APPARATUS FOR PREPARING TAX REFUND APPLICATION FORM, METHOD OF AND APPARATUS FOR OUTPUTTING TAX REFUND APPLICATION FORM, METHOD OF AND APPARATUS FOR CONTROLLING TAX REFUND PROCEDURE, AND COMPUTER PRODUCT

(75) Inventor: Izumi Tanemura, Osaka (JP)

(73) Assignee: The Japan Research Institute, Limited, Tokyo (JP)

( * ) Notice: Subject to any disclaimer, the term of this patent is extended or adjusted under 35 U.S.C. 154(b) by 1019 days.

(21) Appl. No.: 10/492,845

(22) PCT Filed: Sep. 30, 2002

(86) PCT No.: PCT/JP02/10179

§ 371 (c)(1),
(2), (4) Date: Apr. 16, 2004

(87) PCT Pub. No.: WO03/036536

PCT Pub. Date: May 1, 2003

(65) Prior Publication Data

US 2004/0254865 A1      Dec. 16, 2004

(30) Foreign Application Priority Data

Oct. 19, 2001   (JP)   ............................. 2001-322239

(51) Int. Cl.
*G06Q 40/00*   (2006.01)

(52) U.S. Cl. .................................................. 705/36 T
(58) Field of Classification Search .................. 705/31, 705/36 T
See application file for complete search history.

(56) References Cited

U.S. PATENT DOCUMENTS

| | | | |
|---|---|---|---|
| 6,546,373 B1 * | 4/2003 | Cerra | ......................... 705/19 |
| 6,609,107 B1 | 8/2003 | Shim | |
| 2002/0169682 A1 * | 11/2002 | Capek et al. | ................. 705/26 |

FOREIGN PATENT DOCUMENTS

| | | |
|---|---|---|
| JP | 2001-195510 A | 7/2001 |
| WO | WO 00/42546 A | 7/2000 |

* cited by examiner

*Primary Examiner*—Jason M Borlinghaus
(74) *Attorney, Agent, or Firm*—Sughrue Mion, PLLC

(57) ABSTRACT

A traveler registers a credit card and merchandise purchased at each of domestic shops with the credit card. The shop transmits purchase information to a card company. The traveler finishes an embarkation procedure and then receives an application form output from an information terminal that is installed in advance. The application form is prepared by the card company and is output to the information terminal. The traveler performs a tax refund application process at a tax refund application counter with a passport and the application form. The merchandise is delivered to the tax refund application counter in a departure airport.

8 Claims, 14 Drawing Sheets

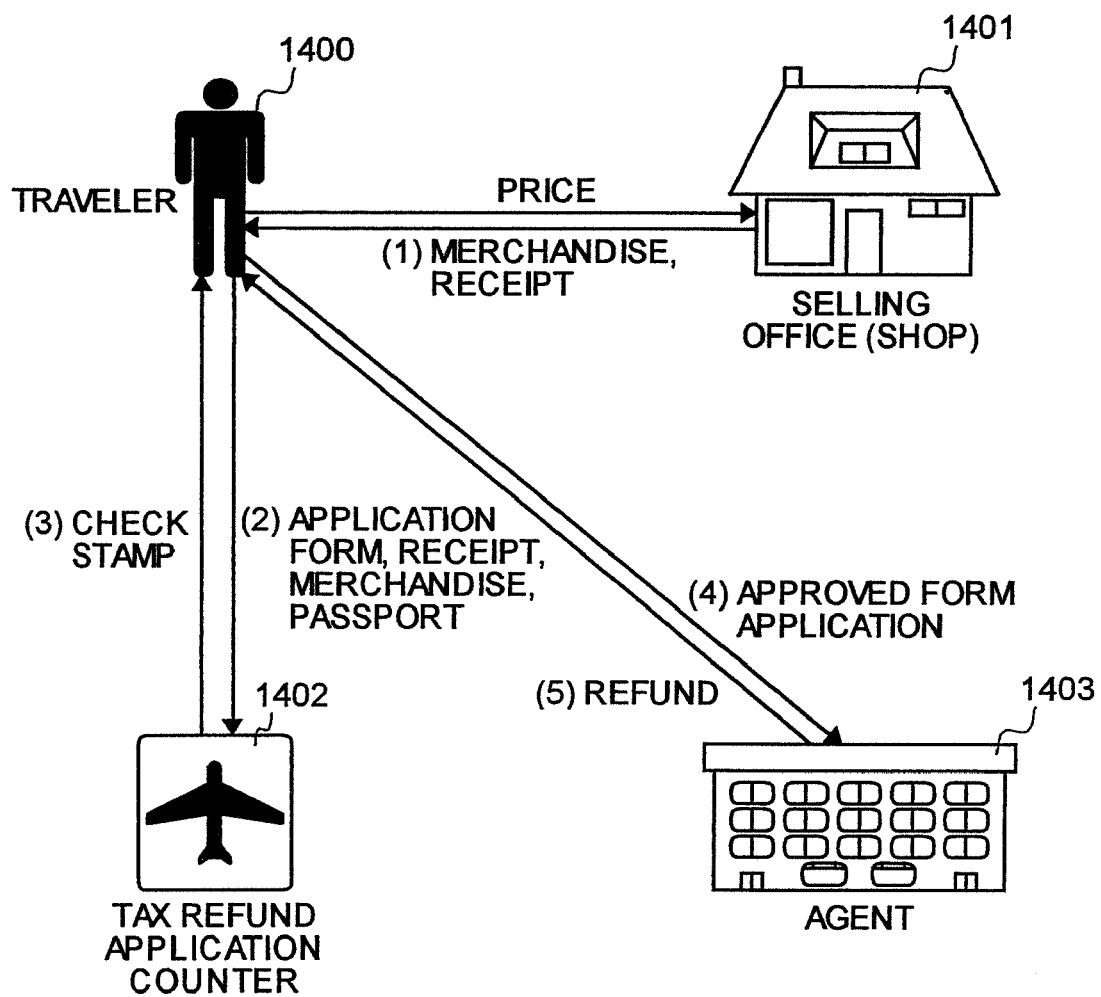

METHOD OF AND APPARATUS FOR PREPARING TAX REFUND APPLICATION FORM, METHOD OF AND APPARATUS FOR OUTPUTTING TAX REFUND APPLICATION FORM, METHOD OF AND APPARATUS FOR CONTROLLING TAX REFUND PROCEDURE, AND COMPUTER PRODUCT

TECHNICAL FIELD

The present invention relates to a method of and an apparatus for preparing a tax refund application form, a method of and an apparatus for outputting the tax refund application form, a method of and an apparatus for controlling a tax refund procedure, which are used for an overseas traveler to apply for a refund of goods and services tax (GST) paid for purchased merchandise during traveling abroad, and a computer program that realizes the methods on a computer.

BACKGROUND ART

A flow of a conventional application for refund of a goods and services tax (GST) paid for purchased merchandise by an overseas traveler during traveling abroad is shown in FIG. 14. A traveler 1400 receives a receipt for merchandise purchased or an application form issued by a shop 1401 when shopping abroad (1). After filling in the application form, the traveler 1400 submits the application form with a passport and the merchandise to a tax refund application counter 1402 (2). After confirming that the merchandise is not used, a staff of the tax refund application counter 1402 stamps the application form (3). The traveler 1400 posts the application form with a stamp to an application agent 1403 (4). Then, the traveler 1400 receives a refund of the GST by a method designated in the application (5).

However, in the conventional method, since the application procedure depends on each country, it is not easy for a traveler to understand and perform the procedure such as preparing of the application form and applying for the following procedure. In addition, it may be difficult to process within limited time from an embarkation procedure to departing of an airplane. For this reason, the traveler may have to depart without performing these procedures, and some travelers cannot receive the refund of the GST.

Another problem is that an operation of the tax refund process is not easy at a shop because various methods of tax refund are used and the shop may have to perform the tax refund process for each traveler.

The present invention has been made to solve the above problems in the conventional technology, with an object to provide a method of and an apparatus for preparing a tax refund application form, a method of and an apparatus for outputting the tax refund application form, a method of and an apparatus for controlling a tax refund procedure, which can efficiently perform a series of procedures and processes including a tax refund application and a tax refund process for the application, and a computer program that realizes the methods on a computer.

DISCLOSURE OF THE INVENTION

To solve the above problems, The apparatus for preparing a tax refund application form, according to one aspect of the present invention includes a disembarkation information receiving unit that receives disembarkation information including personal information and credit card information of a traveler disembarked, a purchase information receiving unit that receives information related to merchandise purchased at each domestic shop that deals with tax refund merchandise, a tax refund application form preparing unit that prepares a tax refund application form based on the disembarkation information and the information related to the merchandise purchased, and a transmitting unit that transmits information related to the tax refund application form prepared by the tax refund application form preparing unit to an information processing terminal arranged near a counter where the traveler applies tax refund after embarkation.

In this case, the traveler includes, for example, a non-resident individual, a non-resident commercial traveler, or the like. According to the present invention, the traveler (for example, a holder of a credit card) can acquire a tax refund application form in which necessary items are written by only performing registration of disembarkation information and purchasing of merchandise which indicates the ID of a credit card or the like.

The apparatus for preparing a tax refund application form, according to another aspect of the present invention further includes an embarkation information receiving unit that receives information related to an embarkation schedule of the traveler, and a delivery designation transmitting unit that transmits information related to designation of delivering the merchandise purchased to the shop based on the information related to the embarkation schedule.

According to the present invention, a traveler (holder of a credit card) can receive the tax refund merchandise after embarkation, and labor for carrying the merchandise that cannot be domestically used can be reduced.

The apparatus for outputting a tax refund application form, according to still another aspect of the present invention includes an input unit that, after embarkation of a traveler disembarked, inputs personal information of the traveler, a display unit that displays information related to merchandise purchased by the traveler at each domestic shop that deals with tax refund merchandise based on the personal information input by the input unit, a designation unit that designates whether tax refund is applied to the merchandise from among the information displayed, a tax refund application form preparing unit that prepares a tax refund application form based on the information related to the merchandise, to which tax refund is applied, designated by the designation unit or the merchandise displayed by the display unit and the information related to the merchandise, to which tax refund is not applied, designated by the designation unit and, and a print unit that prints the tax refund application form prepared by the tax refund application form preparing unit.

According to the present invention, the traveler (holder of a credit card) can acquire a tax refund application form in which necessary items are written by only inputting ID information (information of a credit card) after embarkation.

The apparatus for controlling a tax refund procedure, according to still another aspect of the present invention includes an input unit that inputs, after embarkation of a traveler disembarked, personal information of the traveler, a display unit that displays information related to the merchandise purchased by the traveler at each domestic shop that deals with tax refund merchandise based on the personal information input by the input unit, a designation unit that designates whether tax refund is applied to the merchandise from among the information related to the merchandise displayed, a tax refund procedure unit that performs a tax refund procedure based on the information related to the merchandise, to which tax refund is applied, designated by the designation unit or the merchandise displayed by the display unit and the information related to the merchandise, to which tax refund is not applied, designated by the designation unit, and a print unit that prints a document representing that the procedure is completed by the tax refund procedure unit.

According to the present invention, in tax refund application, it is satisfied that the traveler (credit card holder) only informs (inputs) an agent of ID information (information related to a credit card). The agent performs an examination based on information related to an informed (input) ID (credit card), so that the agent can complete an examination procedure related to a tax refund application.

The apparatus for controlling a tax refund procedure, according to still another aspect of the present invention further includes a transmitting unit that transmits a tax refund amount determined by the tax refund procedure performed by the tax refund procedure unit to an information processing terminal of a transfer agent who transfers the amount to the traveler's bank account or credit card account.

According to the present invention, a refund of the GST can be transferred to an account of the traveler, and a refund process can be efficiently performed.

The method of preparing a tax refund application form, according to still another aspect of the present invention includes steps of receiving disembarkation information including personal information and credit card information of a traveler disembarked, receiving information related to merchandise purchased at each domestic shop that deals with tax refund merchandise, preparing a tax refund application form based on the disembarkation information and the information related to the merchandise purchased, and transmitting information related to the tax refund application form prepared by the tax refund application form preparing unit to an information processing terminal arranged near a counter where the traveler applies tax refund after embarkation.

According to the present invention, a traveler (for example, a holder of a credit card) can acquire a tax refund application prepared in which necessary items are written by only performing registration of disembarkation information and purchasing of merchandise which indicates the ID of a credit card or the like.

The method of preparing a tax refund application form, according to still another aspect of the present invention further includes steps of receiving information related to an embarkation schedule of the traveler, and transmitting information related to designation of delivering the merchandise purchased to the shop based on the information related to the embarkation schedule.

According to the present invention, a traveler (holder of a credit card) can receive the tax refund merchandise after embarkation, and labor for carrying the merchandise that cannot be domestically used can be reduced.

The method of outputting a tax refund application form, according to still another aspect of the present invention includes steps of inputting, after embarkation of a traveler disembarked, personal information of the traveler, displaying information related to merchandise purchased by the traveler at each domestic shop that deals with tax refund merchandise based on the personal information input by the input unit, designating whether tax refund is applied to the merchandise from among the information related to the merchandise displayed, preparing a tax refund application form based on the information related to the merchandise to which tax refund is applied or the merchandise displayed and the information related to the merchandise to which tax refund is not applied, and printing the tax refund application form prepared.

According to the present invention, the traveler (holder of a credit card) can acquire a tax refund application form in which necessary items are written by only inputting ID information (information of a credit card) after embarkation.

The method of controlling a tax refund procedure, according to still another aspect of the present invention includes steps of inputting, after embarkation of a traveler disembarked, personal information of the traveler, displaying information related to the merchandise purchased by the traveler at each domestic shop that deals with tax refund merchandise based on the personal information input, designating whether tax refund is applied to the merchandise from among the information related to the merchandise displayed, performing a tax refund procedure based on the information related to the merchandise to which tax refund is applied or the merchandise displayed and the information related to the merchandise to which tax refund is not applied, and printing a document representing that the procedure is completed by the performing.

According to the present invention, in tax refund application, it is satisfied that the traveler (credit card holder) only informs (inputs) an agent of ID information (information related to a credit card). The agent performs an examination based on information related to an informed (input) ID (credit card), so that the agent can complete an examination procedure related to a tax refund application.

The method of controlling a tax refund procedure, according to still another aspect of the present invention further includes a step of transmitting a tax refund amount determined by the performing to an information processing terminal of a transfer agent who transfers the amount to the traveler's bank account or credit card account.

According to the present invention, a refund of the GST can be transferred to an account of the traveler, and a refund process can be efficiently performed.

The computer program according to still another aspect of the present invention realizes the method according to the above aspects on a computer.

BRIEF DESCRIPTION OF THE DRAWINGS

FIG. 14 is a schematic of a conventional tax refund application procedure.

BEST MODE FOR CARRYING OUT THE INVENTION

Exemplary embodiments of a method of and an apparatus for preparing a tax refund application form, a method of and an apparatus for outputting the tax refund application form, a method of and an apparatus for controlling a tax refund procedure, and a computer program that realizes the methods on a computer, according to the present invention are explained in detail with reference to the accompanying drawings.

OUTLINE OF THE EMBODIMENT

Figure 1:
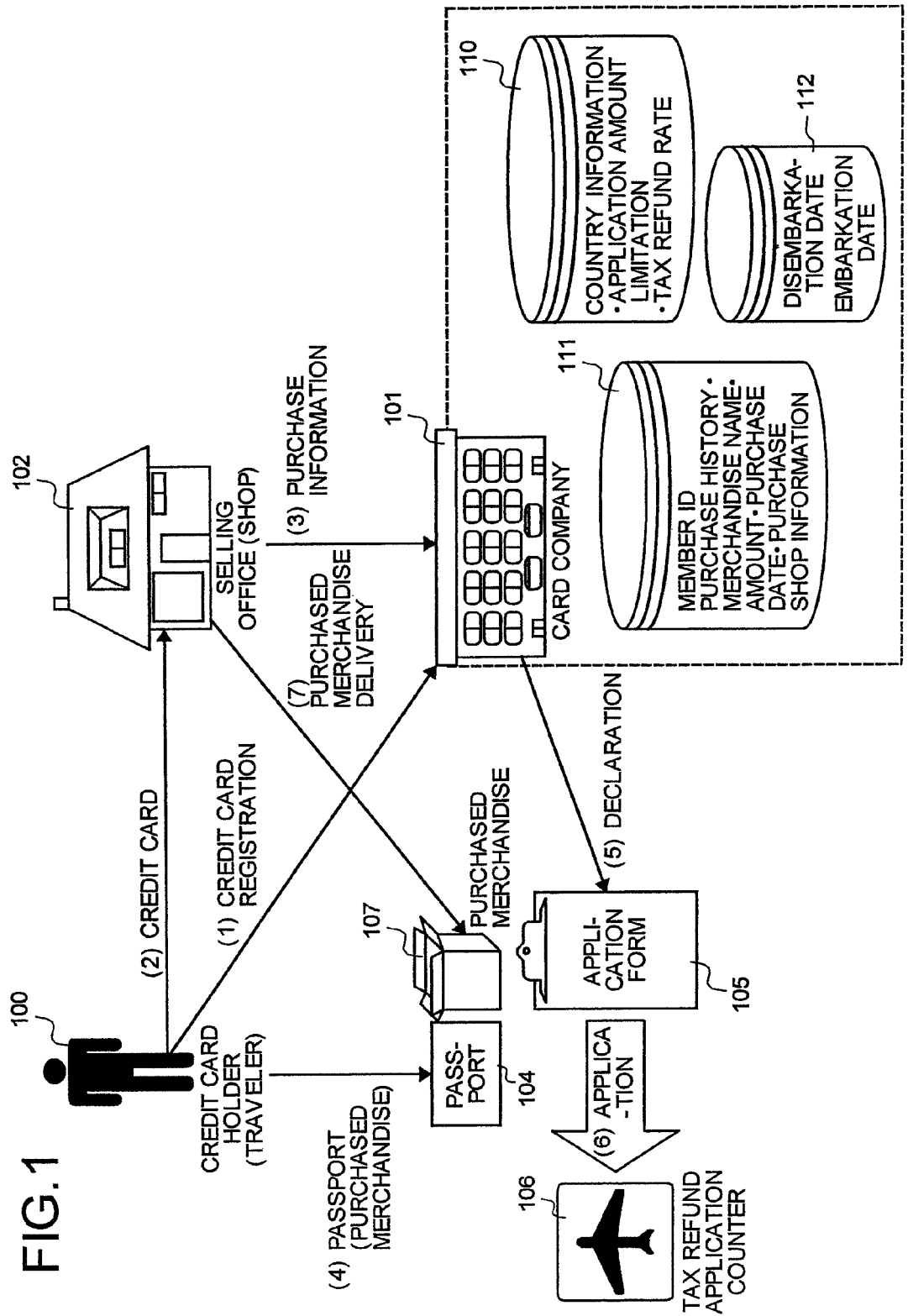
FIG. 1 is a schematic of overall procedure according to an embodiment of the present invention.

FIG. 1 is a schematic of overall procedure according to an embodiment of the present invention. First, a credit card holder (traveler) 100 registers a credit card on a card company 101 simultaneously with disembarkation or after disembarkation (1). Information to be registered includes, for example, a member ID, a disembarkation data, and, if necessary, an embarkation data. Based on the registration, necessary databases 111 and 112 are prepared. If necessary, country-by-country information is also extracted from a database 110.

The traveler purchases merchandise (receives service) by using the registered credit card at each domestic selling office (shop) 102 (2). The selling office 102 transmits purchase information (purchase history information) of the purchased merchandise (provided service) to the card company 101 (3). The transmitted purchase information is stored in the database 111 of the card company 101.

The credit card holder (traveler) 100 complete an embarkation procedure while bringing the passport 104 and the purchased merchandise, and then receives a application form 105 output from an information terminal that is installed in advance (4). The company 101 prepares an application form 105 by procuration based on the databases 110 and 111, and outputs the application form 105 to an information terminal installed in advance in response to a request from the traveler 100 brings the passport 104 and the application form 105 to a tax refund application counter 106 to perform a tax refund procedure (5). In this manner, the traveler 100 performs the tax refund procedure.

In addition, in registration of a credit card (1), embarkation information (airline ticket information in refunding (such as embarkation date, embarkation flight, and embarkation airport)) can be simultaneously registered. When the selling office 102 transmits purchasing information to the card company 101, the selling office 102 acquires the embarkation information of the purchaser (traveler) 100, and (7) purchased merchandise 107 can be delivered to the tax refund application counter 106 of the departure airport. In this manner, the traveler 100 can reduce labor for transporting the purchased merchandise. The traveler 100 receives the purchased merchandise at the tax refund application counter 106. Therefore, it can be easily and reliably proved that the purchased merchandise is not consumed.

System Configuration of the Embodiment

Figure 2:
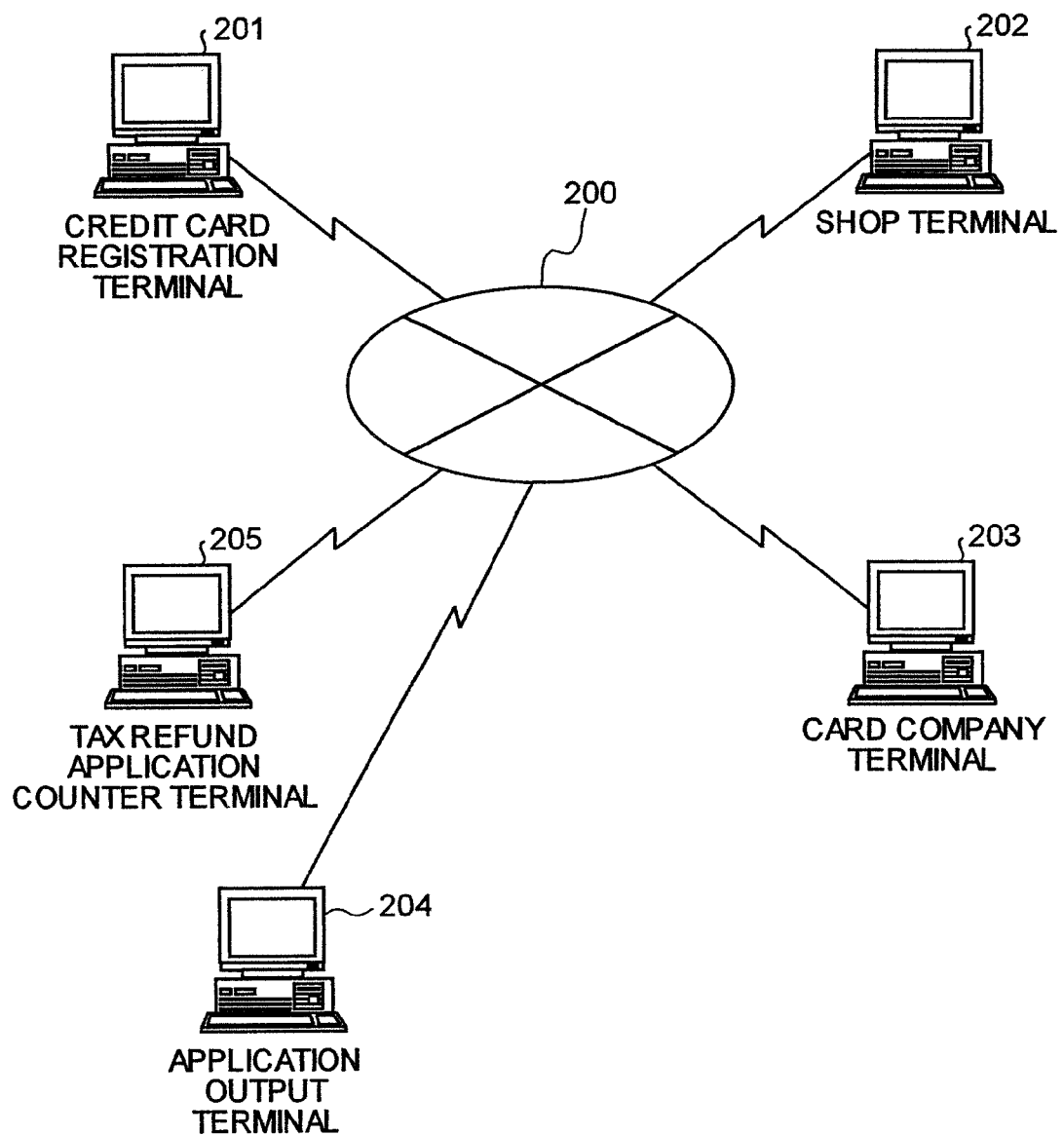
FIG. 2 is a schematic of a system configuration according to the embodiment.

FIG. 2 is a schematic of a system configuration according to the embodiment. A credit card registration terminal 201, a shop terminal 202, a card company terminal 203, an application form output terminal 204, and a tax refund application counter terminal 205 are connected to each other by the Internet or a leased line network 200.

In this case, the credit card registration terminal 201 is an information terminal which is used when a credit card is registered by the traveler 100 in disembarkation or after disembarkation, i.e., disembarkation information is input by using a credit card. Therefore, the credit card registration terminal 201 is installed near a counter on which disembarkation procedure is performed. The credit card registration terminal 201 may be a mobile information processing terminal such as a mobile telephone held by the traveler 100.

The shop terminal 202 is an input terminal which is used to input information when the traveler 100 purchases tax refund merchandise at the domestic shop 102. Therefore, the shop terminal 202 is installed in each shop 102. The shop terminal 202 may be realized by giving the function thereof to a POS terminal or a credit authorization terminal (CAT).

The card company terminal 203 is installed in the card company 101, prepares a tax refund application form, i.e., inputs necessary items (such as name, passport number, information related purchased merchandise) in predetermined columns of a predetermined format. In this manner, a function of a tax refund application form preparing apparatus is realized. However, the tax refund application form preparing apparatus may realize its function by connecting a center server (not shown), which is arranged independently of the card company terminal 203, to the network 200.

The application form output terminal 204 is installed near the counter where tax refund application is performed, and is operated by the traveler 100 who has finished an embarkation procedure. In this manner, the function of the tax refund application form output apparatus according to this embodiment is realized. The tax refund application counter terminal 205 is installed in the counter where the tax refund application is performed, and is operated by an agent. In this manner, the function of the tax refund procedure control apparatus according this embodiment is realized.

The details of the credit card registration terminal 201, the shop terminal 202, the card company terminal 203, the application form output terminal 204, and the tax refund application counter terminal 205 will be described later.

(Hardware Configuration of the Terminal Apparatuses)

Figure 3:
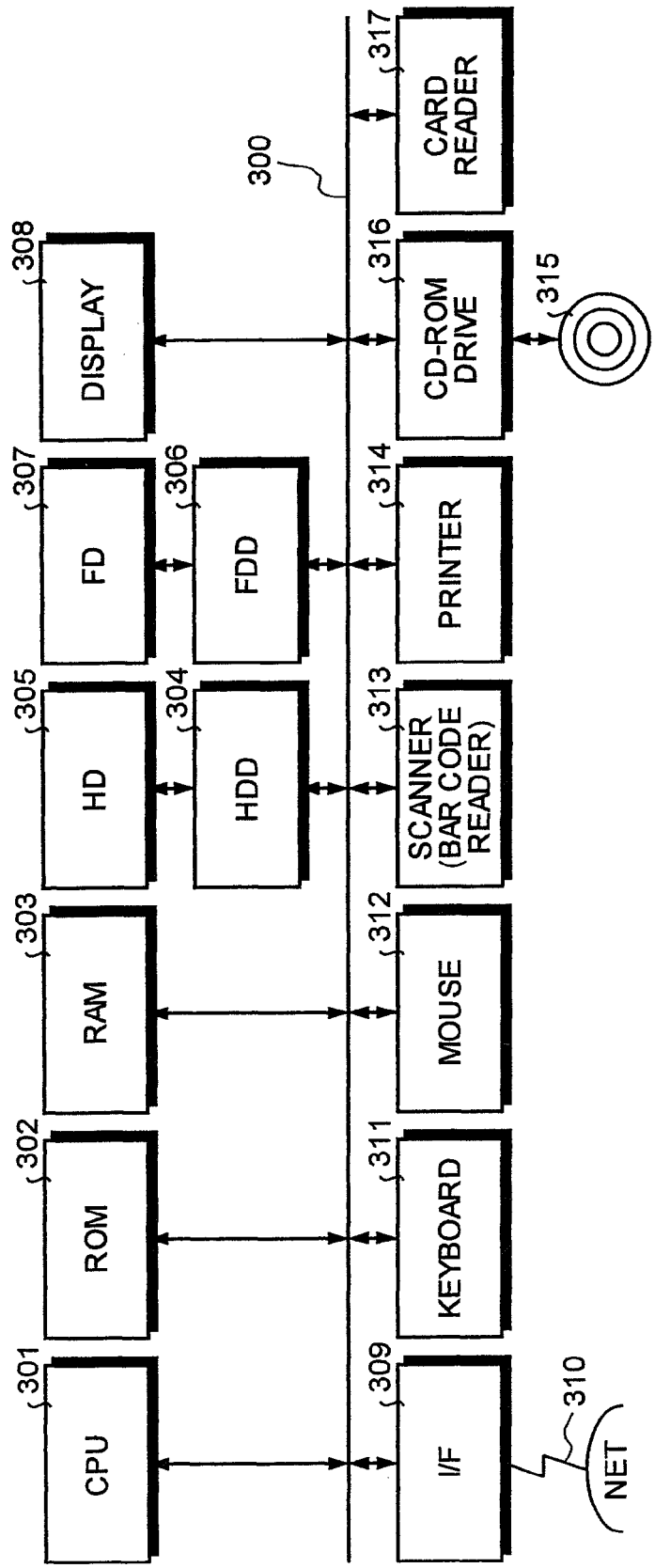
FIG. 3 is a schematic of a hardware configuration of a credit card registration terminal, a shop terminal, a card company terminal, an application form output terminal, and a tax refund application counter terminal, according to the embodiment.

FIG. 3 is a schematic of a hardware configuration of the credit card registration terminal 201, the shop terminal 202, the card company terminal 203, the application form output terminal 204, and the tax refund application counter terminal 205 according to the embodiment. Reference numeral 301 denotes a CPU that controls all the apparatuses, reference 302 denotes a ROM that stores a basic input/output program therein, and reference symbol 303 denotes a RAM used as a work area of the CPU 301.

Reference numeral 304 denotes an HDD (hard disk drive) that control read/write of data to an HD (hard disk) 305 under the control of the CPU 301, and reference numeral 305 denotes an HD that stores data written under the control of the HDD 304. Reference numeral 306 denotes an FDD (flexible disk drive) that controls read/write of data to an FD (flexible disk) 307 under the control of the CPU 301, and reference numeral 307 denotes an FD serving as an example of a detachable storage medium that stores a data written under the control of the FDD 306.

Reference numeral 308 denotes a display that displays various data such as a cursor, a menu, a window, a character, or an image. Reference numeral 309 denotes a network board that is connected to a network NET through a communication cable 310 and that functions as an interface between the network and the CPU 301. Reference numeral 311 denotes a keyboard having a plurality of keys for inputting characters, numeral values, various designations, and reference numeral 312 denotes a mouse that selects or executes various designations, selects an object to be processed, and moves a cursor.

Reference numeral 313 denotes a scanner (or bar code reader) that optically reads characters or images, and reference numeral 314 denotes a printer that prints characters or images under the control of the CPU 301. Reference numeral 315 denotes a CD-ROM serving as a detachable recording medium, and reference numeral 316 denotes a CD-ROM drive that controls read of data from the CD-ROM 315. Reference numeral 317 denotes a card reader constituted by a read mechanism that read information stored in a credit card, e.g., a magnetic reader or a contact-type IC card reader (terminal) or the like, and reference numeral 300 denotes a bus that connects the above components.

(Functional Configuration of the Credit Card Registration Terminal Apparatus 201)

Figure 4:
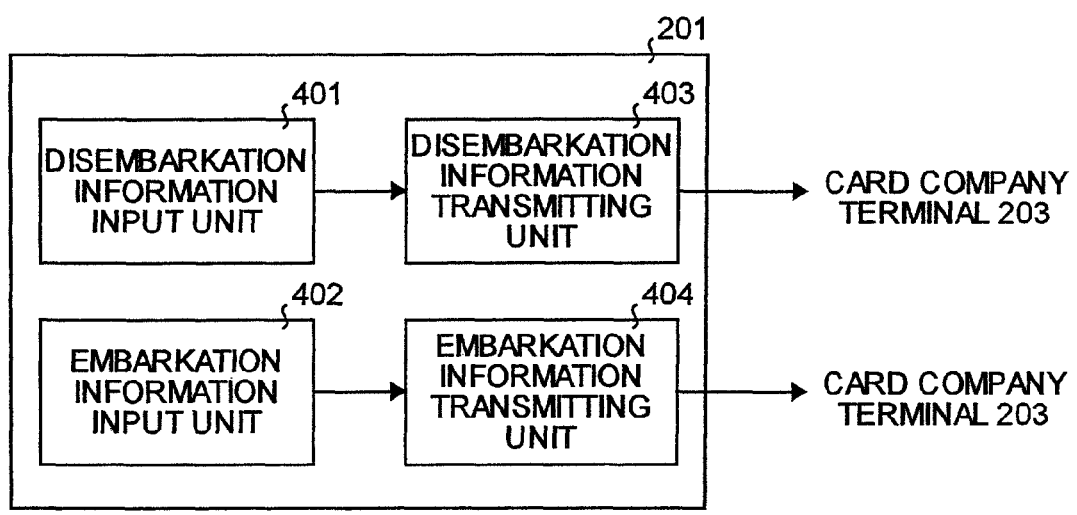
FIG. 4 is a block diagram of the credit card registration terminal according to the embodiment.

FIG. 4 is a block diagram of the credit card registration terminal 201 according to the embodiment.

The credit card registration terminal 201 includes a disembarkation information input unit 401, an embarkation information input unit 402, a disembarkation information transmitting unit 403, and an embarkation information transmitting unit 404.

In this case, the disembarkation information input unit 401 performs a process of inputting information (credit card number, expiration date, name of holder, and the like) and disembarkation information (disembarkation date or the like) input by the traveler 100. The embarkation information input unit 402 performs a process of inputting information (credit card number, expiration date, name of holder, and the like) stored in the credit card and embarkation information (embarkation expected date, departure airport, flight name, and the like) input by the traveler 100.

The functions of the disembarkation information input unit 401 and the embarkation information input unit 402 are realized by, for example, the keyboard 311, the mouse 312, the scanner 313, the card reader 317, and the like shown in FIG. 3. More specifically, the disembarkation information input unit 401 and the embarkation information input unit 402 are constituted by a read mechanism that reads information stored in the credit card in the card reader 317, for example, a magnetic reader or a contact-type IC card read device (terminal) and a plurality of keys (may be a touch-panel type software keyboard or the like). With this configuration, necessary information to be input by the traveler 100 can be easily and rapidly input in an interactive mode.

The disembarkation information transmitting unit 403 transmits the information input by the disembarkation information input unit 401 to the card company terminal 203 through the network 200. The embarkation information transmitting unit 404 transmits the information input by the embarkation information input unit 402 to the card company terminal 203 through the network 200. The functions of the disembarkation information transmitting unit 403 and the embarkation information transmitting unit 404 are realized by, for example, the I/F 309 or the like shown in FIG. 3.

(Functional Configuration of the Shop Terminal Apparatus 202)

Figure 5:
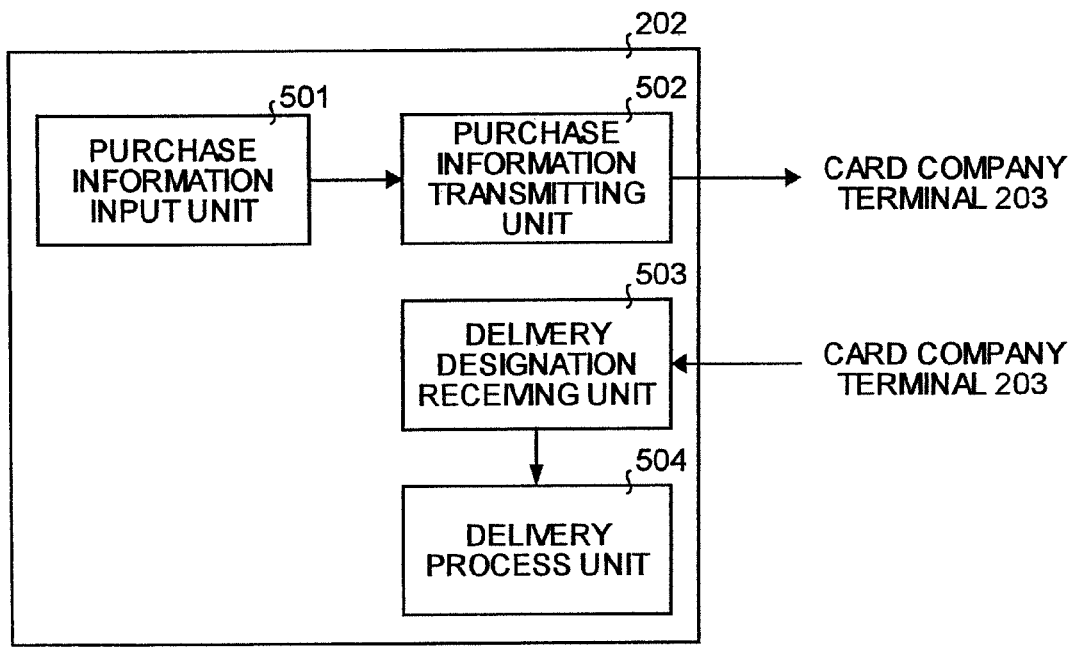
FIG. 5 is a block diagram of the shop terminal according to the embodiment.

FIG. 5 is a block diagram of the shop terminal 202 according to the embodiment.

The shop terminal 202 includes a purchasing information input unit 501, a purchasing information transmitting unit 502, a delivery designation reception unit 503, and a delivery process unit 504.

With the purchasing information input unit 501, a process of inputting information related to the merchandise purchased by the traveler 100 is performed by an agent in the selling office 102. More specifically, when a paying process for merchandise to be purchased is performed with the credit card of the traveler 100, information related to the purchased merchandise, information related the price (including tax) of the purchased merchandise, and the like can be input. The information related to the purchased merchandise includes image (photograph) information and video information. In use of the image information and the video information, the agent can be efficiently performs a check operation. In addition, in use of the image information and the video information, the purchased merchandise can also be checked by a user. The function of the purchasing information input unit 501 is realized by, for example, the keyboard 311, the mouse 312, the scanner 313, the card reader 317 (which are shown in FIG. 3), a digital still camera (not shown), a digital video camera (not shown), or the like.

The purchasing information transmitting unit 502 transmits the information input by the purchasing information input unit 501 to the card company terminal 203 through the network 200. The embarkation information transmitting unit 404 transmits the information input by the embarkation information input unit 402 to the card company terminal 203 through the network 200. The function of the purchasing information transmitting unit 502 is realized by, for example, the I/F 309 or the like shown in FIG. 3.

The delivery designation reception unit 503 receives information related to a delivery designation transmitted from the card company terminal 203. The function of the delivery designation reception unit 503 is realized by, for example, the I/F 309 shown in FIG. 3. The delivery designation reception unit 503 may receives the information related to the delivery designation when the information is transmitted to the card company terminal 203 by the purchasing information transmitting unit 502.

The delivery process unit 504 arranges the merchandise purchased by the traveler 100 such that the merchandise is delivered to a departure airport depending on a flight on an embarkation date of the traveler 100 based on the information related to the delivery designation received by the delivery designation reception unit 503. More specifically, the delivery process unit 504 outputs a delivery slip and displays it. The function of the delivery process unit 504 is realized such that a program recorded on the ROM 302, the RAM 303, the HD 305, the FD 307, the CD-ROM 315, or the like is executed by the CPU 301 to cause the printer 314 to print information or to cause the display 308 to display the information.

(Functional Configuration of the Card Company Terminal Apparatus 203)

Figure 6:
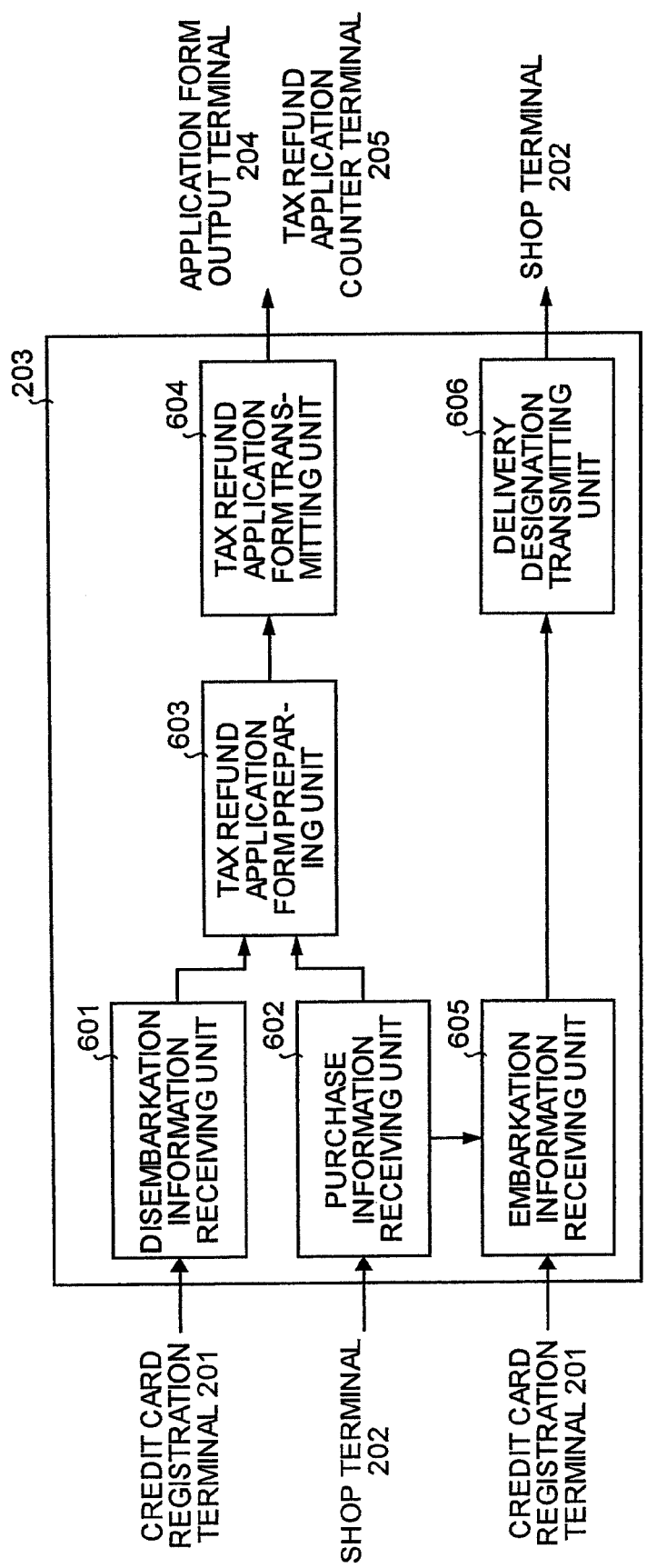
FIG. 6 is a block diagram of the card company terminal according to the embodiment.

FIG. 6 is a block diagram of the card company terminal 203 according to the embodiment.

The card company terminal 203 includes a disembarkation information reception unit 601, a purchase information reception unit 602, a tax refund application form preparing unit 603, a tax refund application transmitting unit 604, an embarkation information reception unit 605, and a delivery designation transmitting unit 606.

The disembarkation information reception unit 601 receives the disembarkation information including information related to the disembarked traveler 100 and ID information such as credit card information of the traveler 100 from the credit card registration terminal 201 through the network 200, and stores the received disembarkation information in the database 111 and 112 shown in FIG. 1. The function of the disembarkation information reception unit 601 is realized by, for example, the I/F 309 or the like shown in FIG. 3. Although the database 110, 111, and 112 are not illustrated in FIG. 6, the database 110, 111, and 112 may be arranged in the card company terminal 203. The databases 110, 111, and 112 may be connected to the card company terminal 203 through a network (not shown).

The purchase information reception unit 602 receives information related to the purchased merchandise in each domestic shop 102 which deals with tax refund merchandise from the shop terminal 202 through the network 200, and stores the received information in the database 111 shown in FIG. 1. At this time, the embarkation information of the traveler 100 stored in the databases 112 may be transmitted to the shop terminal 202. The function of the purchase information reception unit 602 is realized by, for example, the I/F 309 shown in FIG. 3.

The tax refund application form preparing unit 603 extracts the disembarkation information received by the disembarkation information reception unit 601 and necessary information from the databases 110, 111, and 112 based on the information related to the purchased merchandise received by the purchase information reception unit 602, and prepares a tax refund application form by using the extracted information. More specifically, as described above, necessary information is extracted from the disembarkation information and the purchased information or the databases 110, 111, and 112, and inputs the extracted information in a predetermined column of a predetermined format of the tax refund application form. The function of the tax refund application form preparing unit 603 is realized by causing the CPU 301 to execute the program recorded on, for example, the ROM 302, the RAM 303, the HD 305, the FD 307, or the CD-ROM 315 shown in FIG. 3.

The tax refund application transmitting unit 604 transmits information related to the tax refund form prepared by the tax refund application form preparing unit 603 to the application form output terminal 204 installed near a counter where the traveler 100 applies tax refund after embarkation through the network 200. The tax refund application transmitting unit 604 may transmit the information to the tax refund application counter terminal 205 without transmitting the information to the application form output terminal 204. Transmission of the information related to the tax refund application form is performed when a request is made by the application form output terminal 204 or the tax refund application counter terminal 205. The function of the tax refund application transmitting unit 604 is realized by, for example, the I/F 309 shown in FIG. 3.

The embarkation information reception unit 605 receives embarkation information related to embarkation schedule of the traveler 100 from the credit card registration terminal 201, and stores the received disembarkation information in the database 112 shown in FIG. 1. The function of the embarkation information reception unit 605 by, for example, the I/F 309 or the like shown in FIG. 3.

The delivery designation transmitting unit 606 transmits information related to a delivery designation of purchased merchandise to the shop terminals 202 of the shops 102 through the network 200 based on the information related to the embarkation schedule received by the embarkation information reception unit 605. In this manner, the traveler (credit card holder) 100 can receive the tax refund merchandise after embarkation, and labor for carrying merchandise which cannot be domestically used can be reduced. The function of the delivery designation transmitting unit 606 is realized by, for example, the I/F 309 shown in FIG. 3.

(Functional Configuration of the Application Output Terminal Apparatus 204)

Figure 7:
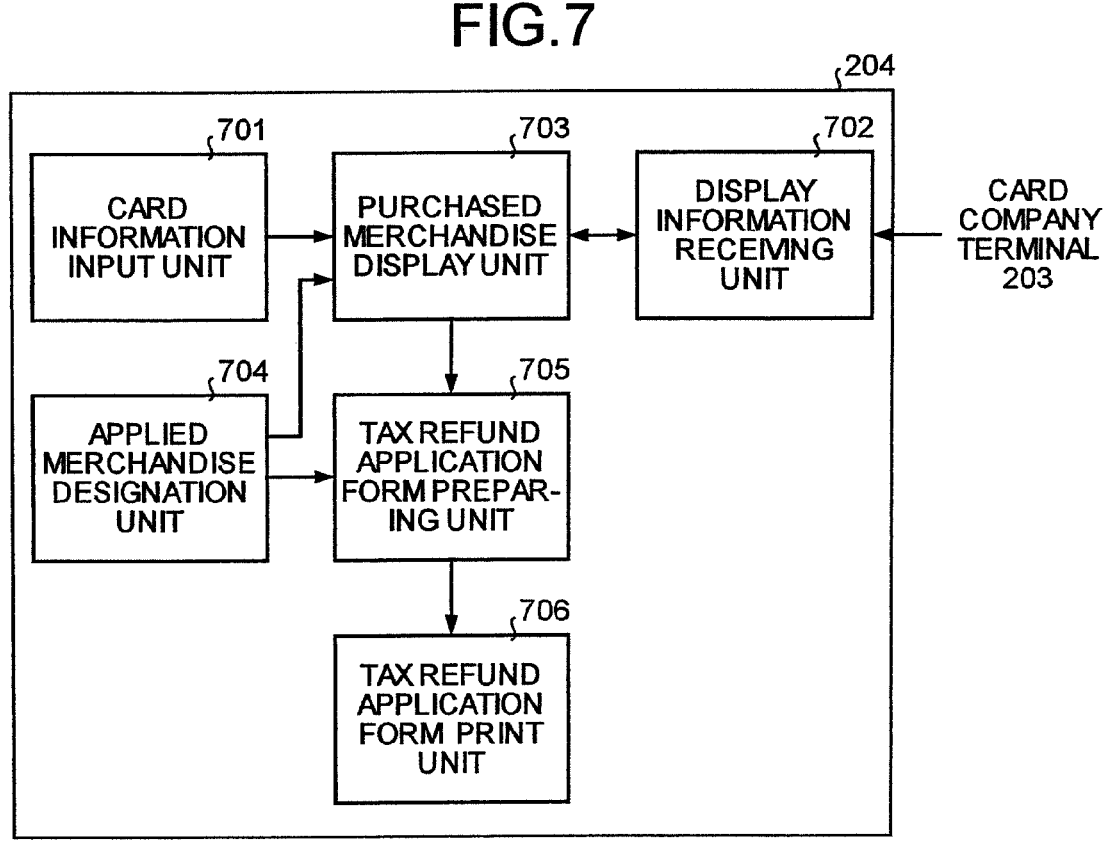
FIG. 7 is a block diagram of the application form output terminal according to the embodiment.

FIG. 7 is a block diagram of the application form output terminal 204 according to the embodiment.

The application form output terminal 204 includes a card information input unit 701, a display information reception unit 702, a purchased merchandise display unit 703, an applied merchandise designation unit 704, a tax refund application form preparing unit 705, and a tax refund application print unit 706.

In this case, the card information input unit 701 performs a process of inputting ID information such as credit card information of the traveler 100 after embarkation of the disembarked traveler 100. The card information input unit 701 is constituted by a read mechanism for reading information stored in the credit card, e.g., a magnetic reader or a contact-type IC card read device (terminal). With this configuration, the traveler 100 can easily and rapidly input the information of the credit card. The function of the card information input unit 701 is realized by, for example, the card reader 317 shown in FIG. 3.

The display information reception unit 702 receives information stored in the database 111 shown in FIG. 1 and related to the merchandise purchased by the traveler in domestic shops which deal tax refund merchandise from the card company terminal 203 through the network 200. The function of the display information reception unit 702 can be realized by, for example, the I/F 309 shown in FIG. 3.

The purchased merchandise display unit 703 displays the information received by the display information reception unit 702 and related to purchased merchandise as a list. The function of the purchased merchandise display unit 703 is realized by the display 308 shown in FIG. 3.

The applied merchandise designation unit 704 designates purchased merchandise to which a tax refund is applied or purchased merchandise to which a tax refund is not applied purchased merchandise listed by the purchased merchandise display unit 703 from the information listed by the purchased merchandise display unit 703 and related to the purchased merchandise. The function of the applied merchandise designation unit 704 is realized by, for example, the keyboard 311 and the mouse 312 shown in FIG. 3. More specifically, the applied merchandise designation unit 704 is constituted by a plurality of keys including ten keys (may be a touch-panel type software keyboard or the like). When some merchandise is not listed, a name of merchandise, an amount of money, and the like may be input with an independently arranged keyboard.

More specifically, when a touch panel method is used, designation is performed such that only displayed merchandise to which tax refund is applied is touched with a finger. Alternatively, designation may be performed such that merchandise to which tax refund is not applied is touched with a finger in the pieces of displayed merchandise. In addition to the touch panel method, a method of displaying pieces of purchased merchandise which are listed with serial numbers and selectively designating the numbers with the ten-key pad or the like may be used. In any case, merchandise to which tax refund is applied and merchandise to which tax refund is not applied may be able to be distinctively designated from the listed pieces of purchased merchandise. With this configuration, the traveler 100 can easily and rapidly selects merchandise to which tax refund is applied in an interactive mode.

The tax refund application form preparing unit 705 prepares a tax refund application form based on information related to the purchased merchandise which is designated by the applied merchandise designation unit 704 and to which tax refund is applied or information related to the purchased merchandise listed by the purchased merchandise display unit 703 and purchased merchandise which is designated by the applied merchandise designation unit 704 and to which tax refund is not applied. The function of the tax refund application form preparing unit 705 is realized such that a program recorded on the ROM 302, the RAM 303, the HD 305, the FD 307, the CD-ROM 315, or the like shown in FIG. 3 is execute by the CPU 301. The tax refund application form has been prepared in the card company terminal 203. In the tax refund application form preparing unit 705, based on the information designated by the applied merchandise designation unit 704, only addition, deletion, change, and the like of target tax refund merchandise may be performed.

The tax refund application print unit 706 prints a tax refund application prepared by the tax refund application form preparing unit 705. The function of the tax refund application print unit 706 is realized by, for example, the printer 314 shown in FIG. 3. In this manner, the traveler (credit card holder) 100 can acquire a tax refund application form in which necessary items are written by only inputting the ID information (credit card information) after embarkation.

(Functional Configuration of the Tax Refund Application Counter Terminal Apparatus 205)

Figure 8:
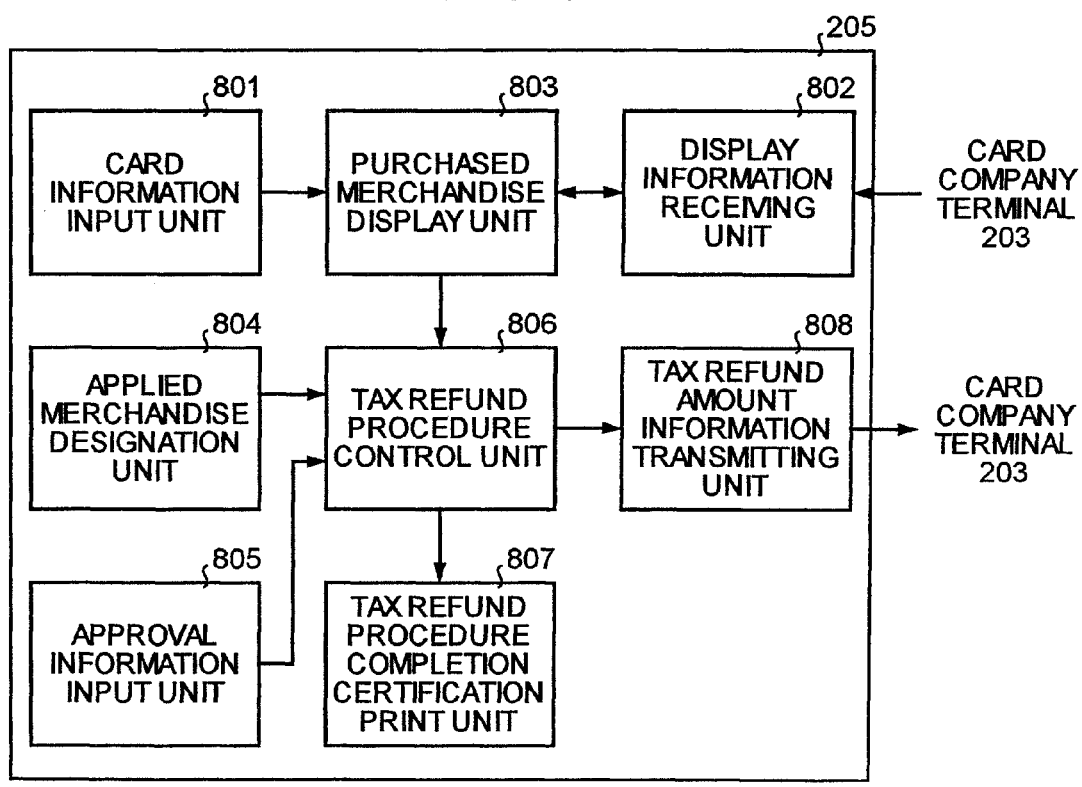
FIG. 8 is a block diagram of the tax refund application counter terminal according to the embodiment.

FIG. 8 is a block diagram of the tax refund application counter terminal 205 according to the embodiment.

The tax refund application counter terminal 205 includes a card information input unit 801, a display information reception unit 802, a purchased merchandise display unit 803, a applied merchandise designation unit 804, an approval information input unit 805, a tax refund procedure control unit 806, a tax refund procedure completion certification print unit 807, and a tax refund amount information transmitting unit 808.

The application form output terminal 204 and the tax refund application counter terminal 205 are different from each other in the following point. That is, the application form output terminal 204 is operated by the traveler 100, and the tax refund application counter terminal 205 is operated by an agent. Therefore, the configurations of the card information input unit 801, the purchased merchandise display unit 803, and the display information reception unit 802 have the same contents as those of the configuration of the card information input unit 701, the purchased merchandise display unit 703, and the display information reception unit 702 in the application form output terminal 204 shown in FIG. 7, and detailed descriptions thereof will be omitted. Input of the credit card information to the card information input unit 801 and input of information related to designation of merchandise to the applied merchandise designation unit 804 may be performed by the traveler 100 or may be performed by an agent.

In the approval information input unit 805, an agent who confirms that the merchandise designated by the applied merchandise designation unit 804 is not consumed performs a process of inputting approval information input after the confirmation. More specifically, a preset confirmation button (not shown) or a predetermined key is depressed by an agent, so that the approval information is input. The function of the approval information input unit 805 is realized by, for example, the keyboard 311, the mouse 312, and the like. More specifically, the approval information input unit 805 is constituted by a plurality of keys (may be a touch-panel type software keyboard) including ten keys. When a comment must be input, the comment may be input by a keyboard which is independently arranged.

The tax refund procedure control unit 806 performs a tax refund application procedure based on information related to the merchandise which is designated by the applied merchandise designation unit 804 and to which tax refund is applied and approval information input by the approval information input unit 805. More specifically, based on the information of a filed tax refund application form, impression of an approval stamp is electrically made, or a tax refund procedure completion certification is prepared, and the information thereof is stored in a predetermined storage region. The function of the tax refund procedure control unit 806 is realized such that a program recorded on, for example, the ROM 302, the RAM 303, the HD 305, the FD 307, the CD-ROM 315, shown in FIG. 3 is executed by the CPU 301.

The tax refund procedure completion certification print unit 807 prints a document (procedure certification completion certification) representing that the procedure is completed by the tax refund procedure control unit 806. The function of the tax refund procedure completion certification print unit 807 is realized by, for example, the printer 314 shown in FIG. 3. In this manner, in tax refund application, it is satisfied that the traveler (credit card holder) 100 merely informs (inputs) an agent of the ID card information (information related to a credit card). The agent executes an examination based on the informed (input) information related to an ID (credit card), so that an examination procedure related to tax refund application can be efficiently completed.

Furthermore, the tax refund amount information transmitting unit 808 transmits, after the tax refund procedure is completed, a tax refund amount determined in the tax refund procedure performed in the tax refund procedure control unit 806 to a terminal (card company terminal 203 in the embodiment) of a transfer agent who transfer the tax refund amount determined by the tax refund procedure performed by the tax refund procedure control unit 806 to an account of the traveler 100 of a card company 101 through the network 200. In this manner, a refund of the GST can be transferred to the account of the traveler 100. The refund process can be easily and rapidly performed. The function of the tax refund amount information transmitting unit 808 is realized by, for example, the I/F 309 shown in FIG. 3.

(Procedures of the Terminal Apparatuses)

Figure 9:
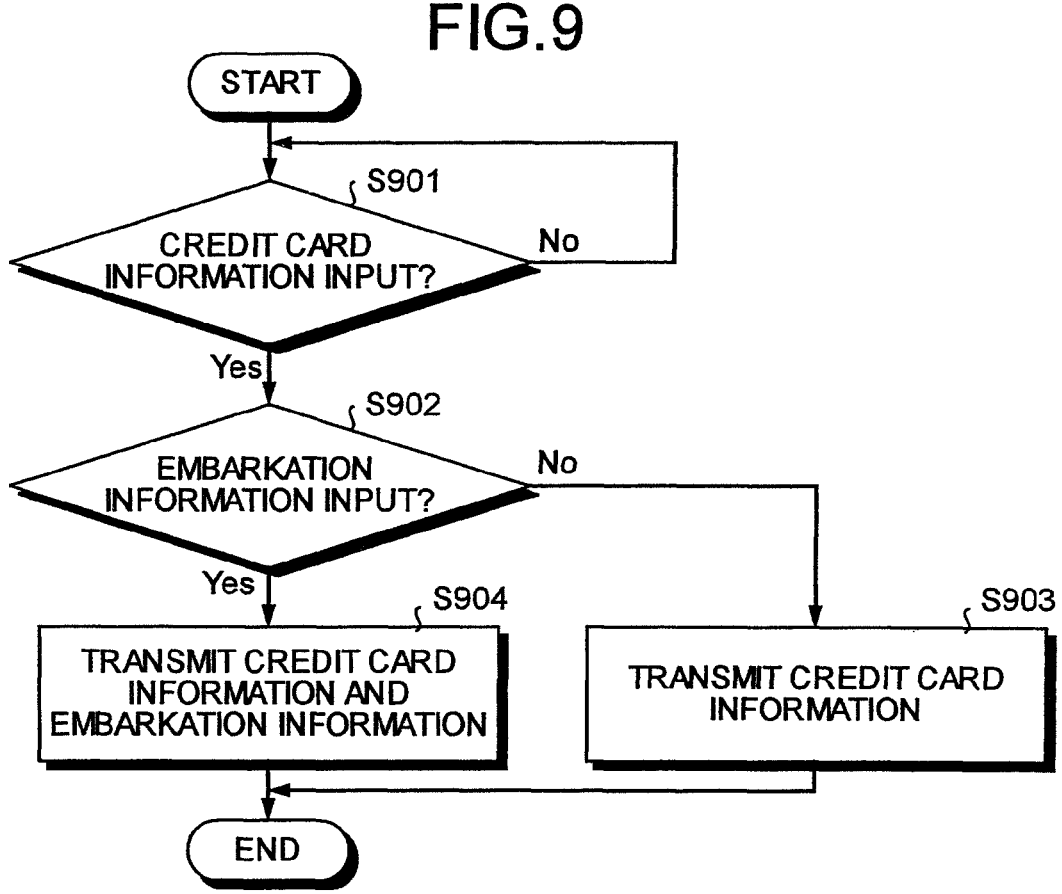
FIG. 9 is a flowchart of process procedure of the credit card registration terminal according to the embodiment.

FIG. 9 is a flowchart of process procedure of the credit card registration terminal 201 according to the embodiment. In the flowchart in FIG. 9, it is decided whether credit card information is input by the traveler 100 or not (step S901). In this case, the credit card registration terminal 201 waits until the credit card information is input, and, when the credit card information is input (step S901: Yes), it is decided whether embarkation information is input by the traveler 100 or not (step S902).

When the embarkation information is not input in step S902 (step S902: No), only the credit card information is transmitted to card company terminal 203 through the network 200 (step S903). On the other hand, when the embarkation information is input in step S902 (step S902: Yes), the credit card information and the embarkation information are transmitted to the card company terminal 203 through the network 200 (step S904). In this manner, a registration procedure in the credit card registration terminal 201 is completed.

Figure 10:
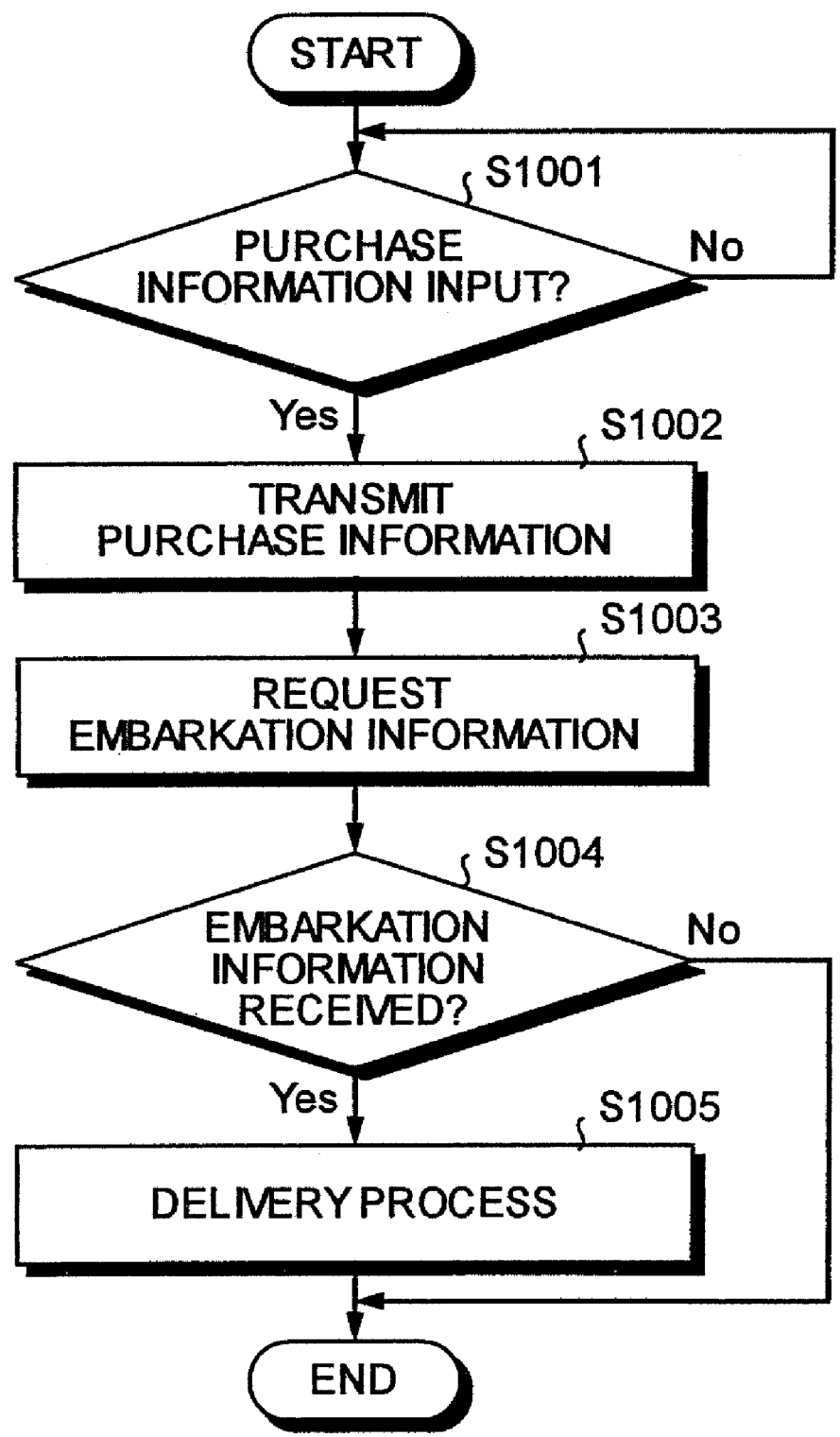
FIG. 10 is a flowchart of process procedure of the shop terminal according to the embodiment.

FIG. 10 is a flowchart of process procedure of the shop terminal 202 according to the embodiment. In the flowchart in FIG. 10, it is decided whether purchasing information is input by an agent of the selling office 102 (or the traveler 100) or not (step S1001). In this case, the shop terminal 202 waits until the purchasing information is input, and, when the purchasing information is input (step S1001: Yes), the purchasing information is transmitted to the card company terminal 203 through the network 200 (step S1002).

When the purchase information is transmitted to the card company terminal 203 in step S1002, embarkation information is requested as needed (step S1003). For example, when the traveler 100 desires to carry purchased merchandise to an airport, i.e., when embarkation information is necessary, the embarkation information is requested. It is decided whether the embarkation information is received or not (step S1004). In this case, the embarkation information is not received because the card company terminal 203 does not receive the embarkation information (step S1004: No), the process is ended without performing any operation. On the other hand, when the embarkation information is received (step S1004: Yes), based on the received embarkation information, a process of delivering the purchased merchandise is performed based on the received embarkation information (step S1005), and a series of processes are ended.

Figure 11:
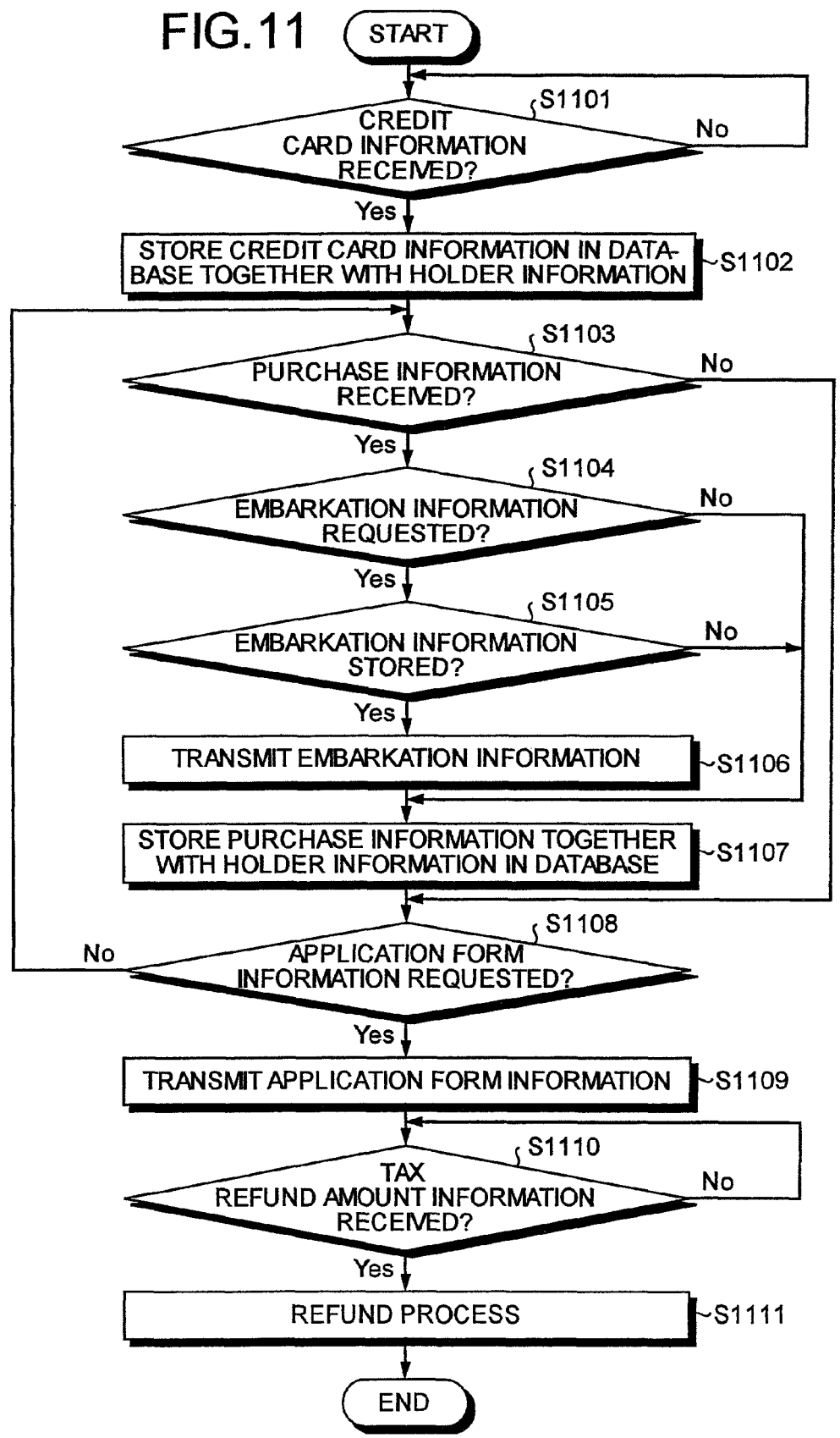
FIG. 11 is a flowchart of process procedure of the card company terminal according to the embodiment.

FIG. 11 is a flowchart of process procedure of the card company terminal 203 according to the embodiment. In the flowchart in FIG. 11, it is decided whether the credit card information is received from the credit card registration terminal 201 or not (step S1101). In this case, the card company terminal 203 waits until the credit card information is received, and, when the card company terminal 203 receives the credit card information (step S1101 Yes), the card company terminal 203 stores the credit card information together with holder (traveler 100) information extracted based on the received credit card information in a predetermined region of the database 111 in units of travelers 100 (step S1102).

It is decided whether the purchasing information of the traveler 100 is received from the shop terminal 202 or not (step S1103). In this case, when the purchasing information is not received (step S1103: No), the card company terminal 203 shifts to step 1108. On the other hand, when the purchasing information is received (step S1103: Yes), it is decided whether embarkation information is requested from the shop terminal 202 or not (step S1104).

In step S1104, when the embarkation information is requested (step S1004: Yes), it is decided whether the embarkation information is stored in the databases 112 or not. When the embarkation information is stored (step S1105: Yes), the embarkation information is transmitted to the shop terminal 202 (step S1106), and the card company terminal 203 shifts to step S1107.

On the other hand, in step S1104, when the embarkation information is not requested (step S1104: No), or when the embarkation information is not stored in step S1105 (step S1105), the card company terminal 203 shifts to step S1107 without performing any operation. Thereafter, in step S1107, the purchasing information received in step S1103 is stored in the database 111 together with holder information.

In step S1108, it is decided whether application form information is requested by the application output terminal 204 or the tax refund application counter terminal 205 is not (step S1108). In this case, the application form information is not requested (step S1108: No), the card company terminal 203 refunds to step S1103. In this manner, the processes in steps S1103 to S1108 are repeated to keep receiving states of pieces of purchase information until the application form information is requested. When the application form information is requested, reception waiting states of the pieces of purchase information are canceled.

In step S1108, when the application form information is requested (step S1108: Yes), the application form information is transmitted to the application output terminal 204 or the tax refund application counter terminal 205 through the network 200 (step S1109). When the application form information is transmitted to the application output terminal 204, the series of processes are ended.

On the other hand, when the application form information is transmitted to the tax refund application counter terminal 205, thereafter, it is decided whether tax refund amount information is received from the tax refund application counter terminal 205 or not (step S1110). The card company terminal 203 waits until the tax refund amount information is received. When the tax refund amount information is received (step S1110: Yes), a refunding process is performed based on the received tax refund amount information (step S1111), and the series of processes are ended.

Figure 12:
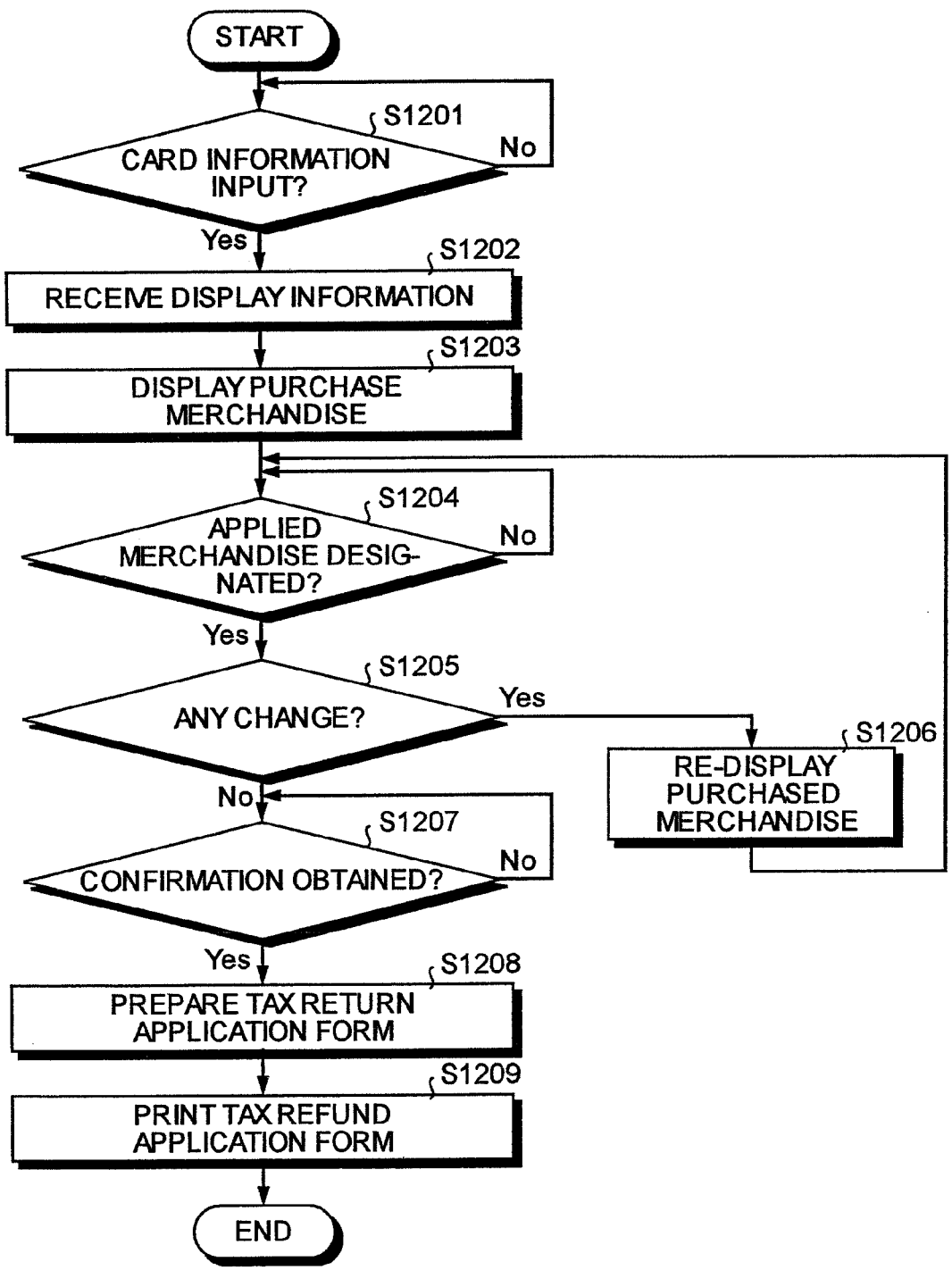
FIG. 12 is a flowchart of process procedure of the application form output terminal according to the embodiment.

FIG. 12 is a flowchart of process procedure of the application form output terminal 204 according to the embodiment. In the flowchart in FIG. 12, it is decided whether the credit card information is input by the traveler 100 or not (step S1201). The application output terminal 204 waits until the credit card information is input, and, when the credit card information is input (step S1201: Yes), display information related to a list of purchased merchandise displayed on the purchased merchandise display unit 703 of the application output terminal 204 is received from the card company terminal 203 (step S1202). At this time, when a tax refund application form has been prepared in the card company terminal 203, information related to the prepared tax refund application form is also received.

A purchased merchandise list is displayed based on the received display information (step S1203). It is decided whether applied merchandise of the displayed purchased merchandise is designated or not (step S1204). In this case, the application output terminal 204 waits until the applied merchandise is designated, and, when the applied merchandise is designated (step S1204: Yes), the application output terminal 204 decides whether a change between the displayed purchased merchandise and the designated applied merchandise is performed or not (step S1205). When the change between the purchased merchandise and the applied merchandise is performed (step S1205: Yes), the application output terminal 204 re-displays the changed contents (step S1206) and refunds to step S1204.

In step S1205, when the change between the purchased merchandise and the applied merchandise is not performed (step S1205: No), the application output terminal 204 waits for a designation of fixation of applied merchandise. When the fixation is designated (step S1207: Yes), based on the fixed contents, a tax refund application form is prepared (step S1208). When the tax refund application form has been prepared in the card company terminal 203, and when the data of the prepared tax refund application form is received, only data related to the fixed applied merchandise may be changed. Thereafter, the prepared tax refund application form is printed (step S1209). The series of processes are ended.

Figure 13:
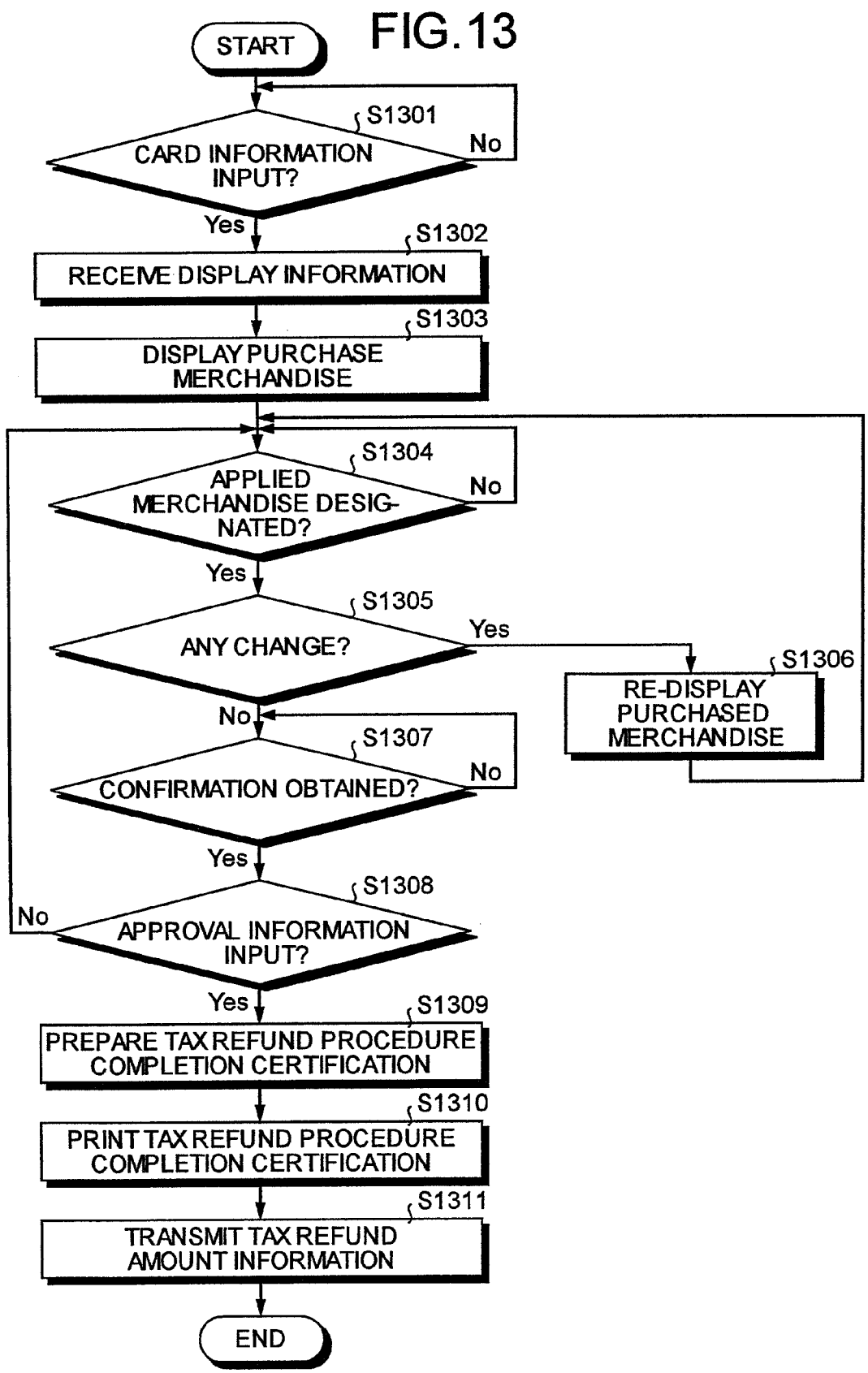
FIG. 13 is a flowchart of process procedure of the tax refund application counter terminal according to the embodiment.

FIG. 13 is a flowchart of process procedure of the tax refund application counter terminal 205 according to the embodiment. In the flowchart in FIG. 13, it is decided whether credit card information is input by the traveler 100 or an agent or not (step S1301). In this case, the application output terminal 204 waits until the credit card information is input, and, when the credit card information is input (step S1301: Yes), display information related to a list of purchased merchandise displayed on the purchased merchandise display unit 803 of the tax refund application counter terminal 205 is received from the card company terminal 203 (step S1302).

The purchased merchandise list is displayed based on the received display information (step S1303). It is decided whether applied merchandise in the displayed purchased merchandise is designated or not (step S1304). In this case, the tax refund application counter terminal 205 waits until the applied merchandise is designated, and, when the applied merchandise is designated (step S1304: Yes), it is decided whether a change between the displayed purchased merchandise and the designated applied merchandise or not (step S1305). When the change between the purchased merchandise and the applied merchandise is performed (step S1305: Yes), the tax refund application counter terminal 205 re-displays the changed contents (step S1306) and refunds to step S1304.

When the change between the purchased merchandise and the applied merchandise is not performed (step S1305: No), the tax refund application counter terminal 205 waits for a designation of fixation of applied merchandise. When the fixation is designated (step S1307: Yes), the tax refund application counter terminal 205 decides whether approval information is input by an agent or not (step S1308). When the approval information is not input (step S1308: No), the tax refund application counter terminal 205 shifts to step S1304, the tax refund application counter terminal 205 waits until applied merchandise is re-designated by the traveler 100 or an agent.

When the approval information is input in step S1308 (step S1308: Yes), a tax refund procedure completion certification is prepared (step S1309), and the prepared tax refund procedure completion certification is printed (step S1310). Thereafter, the tax refund amount information is transmitted to the card company terminal 203 through the network 200 (step S1311), and the series of processes are ended.

(Procedures of Traveler 100)

A series of procedures of the traveler 100 will be described below. In disembarkation, the traveler takes a disembarkation examination and then registers credit card information by using the credit card registration terminal 201. At this time, as described above, when an embarkation schedule or the like is determined, the traveler registers an embarkation date, an airport to be used in embarkation, a flight name, and the like to receive delivery service in shopping.

In shopping, the traveler 100 purchases merchandise with the registered credit card. In this case, the following functions can also be added.

1) A function that prints the merchandise as tax refund merchandise on a detailed statement:

Since it is difficult for the traveler 100 to decide whether merchandise is an object to which tax refund is applied or not, a function of printing notes representing that the merchandise is an object to which tax refund is applied or that the merchandise must be exported while being kept unconsumed to apply tax refund to the merchandise on a duplicate of a detailed statement of the card in purchasing may be added. In order to realize this function, a database related to merchandise information (not shown) is arranged, information related to merchandise stored in the database is referred to when the detailed statement is printed.

2) A function of printing the minimum amount at which tax refund can be applied on a detailed statement:

In a country such as Singapore or Australia where amount limitation is not set for an amount of each purchase and amount limitation is set for an amount of purchases in one selling office or shops of the same chain, a function of printing a balance amount between the purchase amount and the applied amount on a detailed statement when the purchase amount at this time does not reach an applied amount may be further added. In order to realize this function, information (not shown) related to purchased merchandise of the traveler 100 until that time is received from the card company terminal 203 through the network 200. When the detailed statement is printed, the received information is referred to. With this function, sales at selling offices can also be promoted.

A function of checking purchase information up to now during stay can further added. More specifically, the traveler 100 accesses the homepage of the credit card company 201 or the like to make it possible to check current purchase information of the traveler 100. Therefore, the traveler 100 can refer to tax refund merchandise purchased until now, a total amount of tax refund, and the like in advance.

In embarkation (in application), the traveler 100 goes to the tax refund application counter 106 with a registered credit card, the passport 104, and merchandise to be applied (except for the purchased merchandise 107 which is requested to be delivered). The traveler 100 makes an agent at the tax refund application counter 106 to check the merchandise, and receives the purchased merchandise 107 which is requested to be delivered.

After the traveler 100 refunds to his/her country, the registration of the credit card is canceled. When the registration is canceled after the refund to the country, embarkation can be officially proved. In addition, a function of printing application contents on a detailed statement sent from the card company 101 after the refund to the country may be added. Furthermore, as in his/her stay, the traveler 100 may be able to refer to the application contents on a homepage in the internet.

In this manner, it is satisfied that the traveler 100 merely purchases merchandise with a credit card, and daringly, various procedures including formation of a procedure document of tax refund application can be simplified as much as possible. The tax refund application procedure can be more reliably completed.

(Procedures at the Selling Office (Shop) 102)

When the traveler 100 purchases merchandise, a credit card payment process is performed. The traveler desires delivery service, a delivery procedure is performed based on embarkation information received from the card company 101 in a payment process. In this manner, entry of passport information exhibited by the traveler 100 and an operation of preparing a tax refund application form which have been performed by the selling office 102 can be made unnecessary.

When information related to confirmation of tax refund application is transmitted from the card company 101, only collation (confirmation) between the information and a duplicate at the selling office 102 may be performed. A conventional procedure of posting a check or the like to each traveler 100 after the selling office 102 waits until the duplicate of a tax refund application form is posted from the traveler 100 is alternatively performed by the card company 101. Therefore, for the selling office 102, the series of refund procedure operations are unnecessary.

(Procedures by an Agent at the Tax Refund Application Counter 106)

When an applicant (traveler 100) comes to the counter, the agent receives a credit card of the applicant and receives purchase information of a tax refund application form from the card company terminal 203. When the applicant uses delivery service, the agent picks up the delivered merchandise. The agent checks the application contents displayed on the display of the tax refund application counter terminal 205 and the merchandise. In this case, merchandise which has been consumed or merchandise which is not held by the applicant at this point are excluded from the objects to be applied.

When all the checks are completed, the applicant depresses a check end button on the screen (approval information is input). Upon completion of the application procedure, a document (tax refund application completion certification) is printed, and the print may be given to the applicant. Finally, the credit card, the merchandise, the passport, and the like are refunded to the applicant, and the series of processes are ended. Conventionally, a plurality of documents such as a tax refund application form and a receipt, pieces of merchandise are independently checked, and check stamps are impressed. However, with the above configuration, list information can be received from the card company 101, and the operations can be made efficient and appropriate.

(Procedures by the Card Company 101)

When a credit card of a registrant (traveler 100) is registered, registration information of the registrant, a destination country of the registrant, and an disembarkation date (embarkation data, airport used in embarkation, and flight information in embarkation) are acquired.

When the credit card is used, based on the information transmitted from the selling office (shop) 102, it is decided whether merchandise can be an object to be applied or not. Authorization result is transmitted, and embarkation information of the registrant is transmitted.

When the credit card information is transmitted from the tax refund application counter terminal 205, based on a purchase record of an applicant, information required for application in each country is transmitted. Upon completion of tax refund application, when tax refund amount information is received, merchandise which is officially subjected to an application process is retrieved, and it is reported to the selling office (shop) 102 which sells the merchandise that the application procedure is completed. More specifically, when a detailed statement is posted, or when the card company 101 communicates with the card company terminal 203 next time, the information is transmitted: Thereafter, the card company 101 refunds the tax refund amount to the account of the credit card of the traveler 100, prepares a detailed statement in which all application results are described, and sends the detailed statement to the traveler 100.

As described above, according to the embodiment, when an applicant (credit card holder) of tax refund merely purchases merchandise with a credit card, the applicant can acquire a tax refund application form in which necessary items are described. In this manner, an advantage that a series of procedures and processes including tax refund application and a refund process to the tax refund application can be efficiently performed is achieved.

The traveler uses delivery service to make it possible to receive merchandise serving as an object to which tax refund is applied after embarkation, and labor of carrying merchandise which is not domestically used can be reduced.

When a traveler (credit card holder) inputs only the information of a credit card after embarkation, the traveler can acquire a tax refund application form in which necessary items are described. Alternatively, when the traveler merely exhibits the credit card to an agent, the agent performs an examination based on informed (input) information related to an ID (credit card) and can complete an examination procedure related to tax refund application. In this manner, an advantage that a series of procedures and processes including tax refund application and a refund process to the tax refund application can be efficiently performed is achieved.

A refund of the GST can be transferred to an account of the traveler. In this manner, the series of processes including a refund process to the tax refund application such as issue of a check can be efficiently performed.

In the present embodiment, a credit card is explained as an example. However, the present invention can be applied to not only a credit card but also media in which ID information can be exhibited or input. For example, a card issued by a bank, a card issued by a predetermined organization except for a card company, or a portable information terminal such as a mobile phone in which ID information is stored may be used.

The tax refund application form preparing method, the tax refund application form output method, or the tax refund procedure control method described in this embodiment may be realized by a prepared computer readable program or realized by executing the program with a computer such as a personal computer or a workstation. This program is recorded on a computer readable recording medium such as an HD, a FD, a CD-ROM, a magneto-optical (MO) disk, or a digital versatile disk (DVD), and is executed such that the program is read from the recording medium by a computer. In addition, the program may be a transmittable medium which can be distributed through a network such as the internet.

As described above, disembarkation information including ID information such as information related to an embarked traveler and credit card information of the traveler is received, information related to purchased merchandise at each domestic shop which deals with tax refund merchandise is received, a tax refund application form is prepared based on the received disembarkation information and the received information related to the purchased merchandise, and information related to the prepared tax refund application form is transmitted to an information processing terminal arranged near a counter where the traveler applies tax refund after embarkation. For this reason, the traveler (for example, credit card holder) registers the disembarkation information and merely purchases merchandise while exhibiting the ID of the credit card, so that the traveler can acquire a tax refund application form in which necessary items are described. In this manner, an advantage that a series of procedures and processes including tax refund application and a refund process to the tax refund application can be efficiently performed is achieved.

According to the present invention, information related to an embarkation schedule of the traveler is received, and information related to designation of delivering the purchased merchandise is transmitted to the shop based on the received information related to the embarkation schedule. For this reason, the traveler (credit card holder) can be receive tax refund merchandise after embarkation, and labor of carrying merchandise which is not domestically used can be reduced. In this manner, an advantage that a series of procedures and processes including tax refund application and a refund process to the tax refund application can be efficiently performed is achieved.

According to the present invention, after embarkation of a disembarked traveler, ID information of the traveler is input, information related to purchased merchandise purchased by the traveler at each domestic shop which deals with tax refund merchandise is displayed as a list based on the input ID information, purchased merchandise to which tax refund is applied or purchased merchandise to which tax refund is not applied are designated in the information related to the purchased merchandise displayed as a list, a tax refund application form is prepared based on the information related to the designated purchased merchandise to which tax refund is applied or the information related to purchased merchandise displayed as a list and the designated purchased merchandise to which tax refund is not applied, and the prepared tax refund application form is printed. For this reason, when the traveler (credit card holder) merely input the ID information (credit card information) after embarkation, a tax refund application form in which necessary items are described can be acquired. In this manner, an advantage that a series of procedures and processes including tax refund application and a refund process to the tax refund application can be efficiently performed is achieved.

According to the present invention, after embarkation of a disembarked traveler, ID information of the traveler is input, information related to purchased merchandise purchased by the traveler at each domestic shop which deals with tax refund merchandise is displayed as a list based on the input ID information, purchased merchandise to which tax refund is applied or purchased merchandise to which tax refund is not applied are designated in the information related to the purchased merchandise displayed as a list, a tax refund procedure is performed based on the information related to the designated purchased merchandise to which tax refund is applied or the information related to purchased merchandise displayed as a list and the designated purchased merchandise to which tax refund is not applied, and a document representing that the procedure is completed is printed. For this reason, in tax refund application, it is satisfied that the traveler (credit card holder) merely inform (input) an agent of the ID information (credit card information) in tax refund application, and the agent performs an examination based on the informed (input) information related to the ID (credit card) and can complete an examination procedure related to tax refund application. In this manner, an advantage that a series of procedures and processes including tax refund application and a refund process to the tax refund application can be efficiently performed is achieved.

According to the present invention, since a tax refund amount determined by a performed tax refund procedure is transmitted to an information processing terminal of a transfer agent who transfers the amount to traveler's account of a bank, a credit card company, or the like, a refund of the GST can be transferred to the account of the traveler. In this manner, an advantage that a series of procedures and processes including a refund process to the tax refund application can be efficiently performed is achieved.

INDUSTRIAL APPLICABILITY

As has been described above, a tax refund application form preparing apparatus, a tax refund application form output apparatus, a tax refund application procedure control apparatus, a tax refund application form preparing method, a tax refund application form output method, and a tax refund application procedure control method according to the present invention, and a program that causes a computer to execute these methods are useful when an overseas traveler performs refund application (tax refund application) of a tax paid for purchased merchandise during his/her stay. When a tax refund applicant (credit card holder) merely purchases merchandise with a credit card, a tax refund application form in which necessary items are described can be acquired. The present invention is suitable for efficiently performing a series of procedures and processes including tax refund application and a refund process to the tax refund application.

The invention claimed is:

1. A system for preparing a tax refund application form for a currently disembarked traveler for use in obtaining a tax refund when the traveler embarks at a later time after making purchases from shops using a credit card, said card not being required to contain software applications or to record purchase information thereon, comprising:

a credit card registration terminal comprising a disembarkation information receiving unit configured to receive disembarkation information, said disembarkation information including personal information and credit card information of a disembarked traveler, and an embarkation information receiving unit configured to receive embarkation information, said embarkation information including a departure location for said traveler for later embarkation;

said credit card registration terminal configured to transmit disembarkation information and embarkation information to a credit card company terminal;

a plurality of shop terminals each located in a respective shop offering merchandise subject to a tax refund, each shop terminal configured to record and transmit to said credit card company terminal purchase information on the basis of at least credit card information;

said credit card company terminal comprising a disembarkation information receiving unit configured to receive said traveler disembarkation information, a purchase information receiving unit configured to receive purchase information, a tax refund form preparation unit configured to prepare data for a tax refund form based upon the received disembarkation information and purchase information, and a tax refund application form transmitting unit configured to transmit tax refund application form data to a tax refund processing;

said credit card company terminal further comprising an embarkation information receiving unit configured to receive embarkation information and a delivery designation transmitting unit configured to transmit a delivery location for said merchandise based upon said embarkation information to at least one of said shop terminals;

a tax refund processing terminal, coupled to said credit card company terminal, configured to generate a completed tax refund application form for use by said traveler in obtaining a refund on qualified purchases, said tax refund application form being based on the tax refund application form data transmitted from said credit card company terminal.

2. A tax refund system for controlling a tax refund procedure for an embarking traveler for use in obtaining a tax refund when the traveler embarks after making purchases at shops using a credit card at shop terminals, said card not being required to contain software applications or to record purchase information thereon, comprising:

a credit card company terminal, comprising a disembarkation information receiving unit configured to receive traveler personal information from a credit card registration terminal, a purchase information receiving unit configured to receive purchase information from a shop terminal, a tax refund form preparation unit configured to prepare data for a tax refund application form based upon said personal information and said purchase information, and a tax refund application form transmitting unit configured to transmit tax refund application form data, said credit card registration terminal comprising an input terminal configured to receive input comprising personal information of the traveler, wherein said personal information comprises credit card information; an application form output terminal configured to receive said tax refund application form data and purchases information from said credit card company terminal, and a display unit configured to display said purchases information and identify purchases that qualify for a tax refund, based on the personal information input;

said application form output terminal further comprising—
- a designation unit configured to designate, for each of the qualified purchases displayed, whether a tax refund application form data has been received from said credit card company terminal;
- a tax refund procedure unit configured to perform a tax refund procedure on said qualified purchases for which the tax refund application form data has been received; and
- a print unit configured to print a document representing that the tax refund procedure is completed by the tax refund procedure unit.

3. The tax refund system according to claim 2, said application form output terminal further comprising:
- a transmitting unit configured to transmit a tax refund amount determined by the tax refund procedure to an information processing terminal of a transfer agent, wherein said transfer agent transfers the tax refund amount to the traveler's bank account or credit card account.

4. A method of preparing a tax refund application form within a tax refund system for an embarking traveler for use in obtaining a tax refund when the traveler embarks after making purchases at shops using a credit card at shop terminals, said card not being required to contain software applications or to record purchase information thereon, comprising:
- receiving at a registration terminal disembarkation information, said disembarkation information including personal information and credit card information of a disembarked traveler, and the traveler's embarkation schedule information;
- receiving at a credit card company terminal, from the registration said disembarkation information and said embarkation schedule information, and receiving from at least one of a plurality of shops that sells merchandise subject to a tax refund and has a shop terminal, information about purchases by the traveler from shops;
- preparing at a credit card company terminal data for a tax refund application form based upon the received information, and transmitting tax refund application form data to a tax refund processing terminal;
- receiving at a tax refund processing terminal from said credit card company terminal the tax refund application form data and, on the basis of the received tax refund application form data, preparing and printing at an application output unit a tax refund application form; and
- transmitting from the credit card company terminal to said shop terminals said embarkation schedule information, said embarkation schedule information designating a departure location for the traveler to receive delivery of said merchandise.

5. A method of controlling a tax refund procedure implemented in a tax refund system for an embarking traveler for use in obtaining a tax refund when the traveler embarks after making purchases at shops using a credit card, said card not being required to contain software applications or to record purchase information thereon, comprising:
- inputting at a registration terminal-personal information of the traveler, said personal information comprising credit card information;
- receiving at a credit card company terminal, from a registration terminal, credit card information and receiving from at least one of a plurality of shops that sells merchandise subject to a tax refund and has a shop terminal, information about purchases by the traveler from shops, and preparing, at said credit card company terminal, tax refund application data based upon the received information;
- displaying on a display unit at a tax refund application terminal, said tax refund application data and said purchase information, received from said credit card company terminal,
- designating at the tax refund application terminal whether a purchase displayed qualifies for a tax refund;
- performing at the tax refund application terminal a tax refund procedure based on the tax refund application data; and
- printing at a printer unit coupled to the tax refund application terminal a document representing that the tax refund procedure is completed.

6. The method according to claim 5, further comprising: transmitting from the tax refund application terminal a tax refund amount determined by the tax refund application terminal to an information processing terminal of a transfer agent, wherein said transfer agent transfers the tax refund amount to the traveler's bank account or credit card account.

7. A computer program product comprising a computer-readable medium encoded with a computer program which is executable by a computer for preparing a tax refund application form in a tax refund system for a currently disembarked traveler for use in obtaining a tax refund when the traveler embarks at a later time after making purchases at shops using a credit card, said card not being required to contain software applications or to record purchase information thereon, according to the following steps:
- receiving at a registration terminal disembarkation information, said disembarkation information including personal information and credit card information of a traveler, receiving at a credit card company terminal, from the registration terminal, said disembarkation information and receiving from at least one of a plurality of domestic shops that sells merchandise subject to a tax refund and has a shop terminal, information about purchases by the traveler from shops, and transmitting said disembarkation information and said purchase information from the credit card company terminal to a tax return form application terminal;
- receiving at the tax return form application terminal from the credit card company terminal said disembarkation information and said purchase information;
- preparing at the tax return form application terminal a tax refund application form information based on said disembarkation information and said purchase information, and
- providing said tax refund application form information to said tax return form application terminal; and
- receiving at an embarkation unit embarkation schedule information of the traveler and providing the embarkation schedule information to the information processing terminal; and
- transmitting from the information processing terminal information designating a departure location of the traveler for delivery of the merchandise, to each of the shop terminals in respective domestic shops based on the embarkation schedule information.

8. A computer program product comprising a computer-readable medium encoded with a computer program which is executable by a computer for controlling a tax refund procedure in a tax refund system for an embarking traveler for use in obtaining a tax refund after making purchases at shops using a credit card at shop terminals, said card not being required to contain software applications or to record purchase information thereon, according to the following steps:

inputting at a registration terminal-personal information of the traveler, said personal information comprising credit card information;

receiving at a credit card company terminal, from a registration terminal, credit card information and receiving from at least one of a plurality of shops that sells merchandise subject to a tax refund and has a shop terminal, information about purchases by the traveler from shops, and preparing tax refund application data, locally or at a remote location, based upon the received information;

displaying on a display unit at an application form output terminal, said tax refund application data and said purchase information, received from said credit card company terminal, designating with said display unit at the application form output terminal whether a purchase displayed qualifies for a tax refund;

performing at the application form output terminal a tax refund procedure based on the tax refund application data; and printing at a printer unit at said the application form output terminal representing that the tax refund procedure is completed.

* * * * *